J. T. WATSON & H. E. ROBINSON.
STRAW CUTTER.
No. 80,524. Patented July 28, 1868.
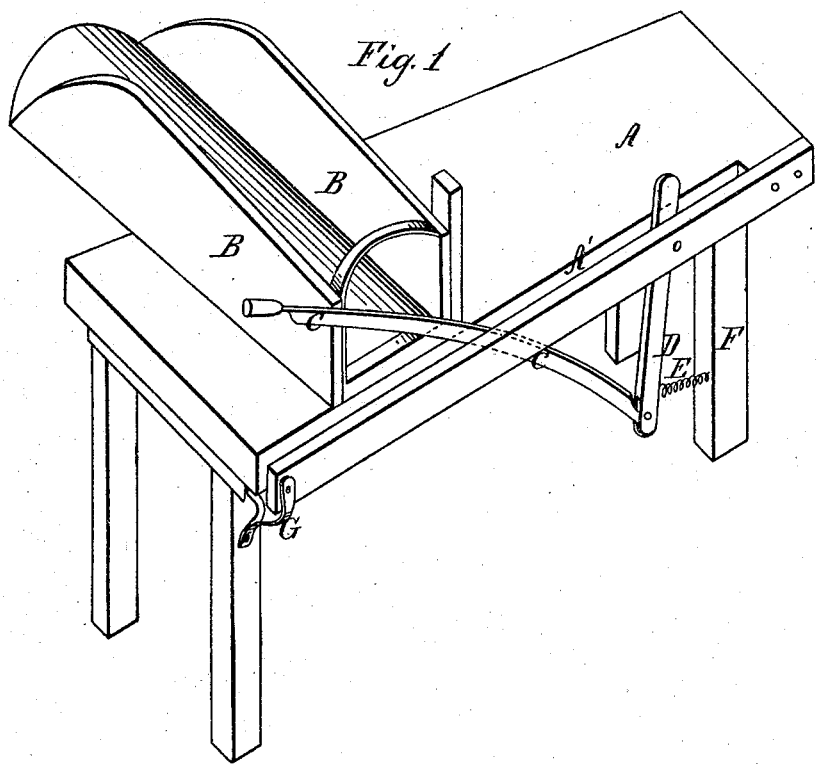

United States Patent Office.

JAMES T. WATSON AND HENRY E. ROBINSON, OF RICHMOND, INDIANA.

Letters Patent No. 80,524, dated July 28, 1868.

IMPROVEMENT IN STRAW-CUTTERS.

*The Schedule referred to in these Letters Patent and making part of the same.*

TO ALL WHOM IT MAY CONCERN:

Be it known that we, JAMES T. WATSON and HENRY E. ROBINSON, of Richmond, in the county of Wayne, and State of Indiana, have invented a new and useful Improved Cutting-Box; and we do hereby declare that the following is a full, clear, and exact description of the same, reference being had to the annexed drawings, in which our improved cutting-box is shown in perspective.

Our improvement relates to a cutting-box for cutting hay or straw, and consists in attaching a knife to an oscillating-arm, so that by the action of the hand of the operator, the knife may have both a downward and longitudinal stroke, the knife being drawn also by means of a spiral spring attached to the oscillating-arm.

In the annexed drawings, A is a bench, on which is placed the box B, of the ordinary form, to receive the hay or straw to be chopped.

The square open end is placed flush with the edge of the slot A, in which the knife plays freely. The lower edge of the box should have a square iron plate with sharp corners attached, as shown in the drawings.

C is the knife, the lower end of which is pivoted to an oscillating-arm, D, pivoted to the bench within the slot A'. A spiral spring, E, is attached to the lower end of the oscillating-arm D and to one of the legs F of the table. This spring draws the knife backwards, in aid of the hand of the operator, who, operating the knife with one hand, may use the other to feed forward the straw or hay in the box.

The stop G is placed in the end of the slot, to limit the downward motion of the knife.

What we claim as our invention, and desire to secure by Letters Patent, is—

The combination of the box B, the table A, the knife C, and the oscillating-arm D, and spring E, substantially as arranged and described, for the purpose set forth.

In testimony whereof, we have signed our names to this specification in the presence of two subscribing witnesses.

JAMES T. WATSON,
HENRY E. ROBINSON.

Witnesses:
W. D. JOHN,
R. A. McNEIL.